United States Patent
Chopra et al.

(10) Patent No.: US 10,108,328 B2
(45) Date of Patent: Oct. 23, 2018

(54) METHOD FOR LINKING SELECTABLE PARAMETERS WITHIN A GRAPHICAL USER INTERFACE

(71) Applicant: VMware, Inc., Palo Alto, CA (US)

(72) Inventors: Radhika Rayadu Chopra, Sunnyvale, CA (US); Huadong Wang, San Francisco, CA (US); Yu Xin, San Mateo, CA (US); Xi Zhu, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 192 days.

(21) Appl. No.: 15/160,934

(22) Filed: May 20, 2016

(65) Prior Publication Data

US 2017/0336952 A1 Nov. 23, 2017

(51) Int. Cl.
*G06F 17/30* (2006.01)
*G06F 3/0484* (2013.01)
*G06F 3/0482* (2013.01)

(52) U.S. Cl.
CPC ........ *G06F 3/04847* (2013.01); *G06F 3/0482* (2013.01); *G06F 3/04842* (2013.01)

(58) Field of Classification Search
CPC ...... G06F 17/24; G06F 17/212; G06F 17/211; G06F 17/2288; G06F 3/04847; G06F 3/04842; G06F 3/0482; G06F 3/0488; G06F 3/04883
USPC ......................................... 715/700, 771, 255
See application file for complete search history.

(56) References Cited

U.S. PATENT DOCUMENTS

| 5,357,621 | A | * | 10/1994 | Cox | ..................... G06F 12/0669 711/172 |
| 8,738,972 | B1 | * | 5/2014 | Bakman | ............... G06F 11/0712 714/47.1 |
| 9,164,795 | B1 | | 10/2015 | Vincent | |
| 2011/0055377 | A1 | | 3/2011 | Dehaan | |
| 2012/0180044 | A1 | | 7/2012 | Donnellan | |
| 2012/0221744 | A1 | | 8/2012 | Heywood | |
| 2013/0041871 | A1 | * | 2/2013 | Das | .................. G06F 17/30896 707/662 |
| 2013/0041931 | A1 | | 2/2013 | Brand | |
| 2013/0297769 | A1 | | 11/2013 | Chang | |
| 2013/0346619 | A1 | | 12/2013 | Panuganty | |
| 2013/0346839 | A1 | | 12/2013 | Dinha | |

(Continued)

OTHER PUBLICATIONS

Office Action dated Feb. 20, 2018 in U.S. Appl. No. 15/251,670.
Office Action dated Apr. 16, 2018 in U.S. Appl. No. 15/251,816.

*Primary Examiner* — Scott T Baderman
*Assistant Examiner* — Hassan Mrabi
(74) *Attorney, Agent, or Firm* — Clayton, McKay & Bailey, PC

(57) ABSTRACT

In a computer-implemented method for linking selectable parameters within a graphical user interface a first selectable parameter and a second selectable parameter are displayed within the graphical user interface, wherein the first selectable parameter is selectable within a first range and the second selectable parameter is selectable within a second range. A selection of the first selectable parameter within the first range is received. Responsive to receiving the selection of the first selectable parameter, an available range of the second range is provided, wherein the available range is a subset of the second range such that a selection of the second selectable parameter is bounded by the available range.

18 Claims, 12 Drawing Sheets

(56) References Cited

U.S. PATENT DOCUMENTS

| | | |
|---|---|---|
| 2014/0019621 A1 | 1/2014 | Khan |
| 2014/0222493 A1 | 8/2014 | Mohan |
| 2014/0337529 A1 | 11/2014 | Antony |
| 2014/0359001 A1 | 12/2014 | Dupoteau |
| 2014/0366155 A1 | 12/2014 | Chang |
| 2015/0067112 A1 | 3/2015 | Gokhale |
| 2015/0149211 A1 | 5/2015 | Ohad |
| 2015/0317101 A1 | 11/2015 | Shiga |
| 2015/0379430 A1 * | 12/2015 | Dirac .................. G06N 99/005 706/12 |
| 2016/0048408 A1 | 2/2016 | Madhu |
| 2016/0142485 A1 | 5/2016 | Mitkar |
| 2016/0147952 A1 | 5/2016 | Garcia |
| 2017/0003994 A1 | 1/2017 | Spinks |
| 2017/0006020 A1 | 1/2017 | Falodiya |
| 2017/0026470 A1 | 1/2017 | Bhargava |
| 2017/0097841 A1 | 4/2017 | Chang |
| 2017/0220394 A1 | 8/2017 | Shim |

* cited by examiner

500

DISPLAY A FIRST SELECTABLE PARAMETER AND A SECOND SELECTABLE PARAMETER WITHIN THE GRAPHICAL USER INTERFACE, WHEREIN THE FIRST SELECTABLE PARAMETER IS SELECTABLE WITHIN A FIRST RANGE AND THE SECOND SELECTABLE PARAMETER IS SELECTABLE WITHIN A SECOND RANGE.
510

DISPLAY A LINKING CONTROL, WHEREIN THE LINKING CONTROL IS SELECTABLE FOR LINKING THE SELECTION OF THE FIRST SELECTABLE PARAMETER TO THE AVAILABLE RANGE OF THE SECOND SELECTABLE PARAMETER.
520

RECEIVE A SELECTION OF THE FIRST SELECTABLE PARAMETER WITHIN THE FIRST RANGE
530

RESPONSIVE TO RECEIVING THE SELECTION OF THE FIRST SELECTABLE PARAMETER, PROVIDE AN AVAILABLE RANGE OF THE SECOND RANGE, WHEREIN THE AVAILABLE RANGE IS A SUBSET OF THE SECOND RANGE SUCH THAT A SELECTION OF THE SECOND SELECTABLE PARAMETER IS BOUNDED BY THE AVAILABLE RANGE.
540

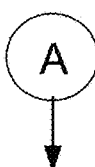

DISPLAY A THIRD SELECTABLE PARAMETER WITHIN THE GRAPHICAL USER INTERFACE, WHEREIN THE THIRD SELECTABLE PARAMETER IS SELECTABLE WITHIN A THIRD RANGE AND WHEREIN THE THIRD SELECTABLE PARAMETER COMPRISES A PLURALITY OF SELECTABLE TYPES.
562

RECEIVE A SELECTION OF THE THIRD SELECTABLE PARAMETER WITHIN THE THIRD RANGE.
564

PROVIDED THE SELECTION OF THE THIRD SELECTABLE PARAMETER EXCEEDS A THRESHOLD VALUE WITHIN THE THIRD RANGE, LIMIT THE PLURALITY OF SELECTABLE TYPES.
566

FIG. 5D

METHOD FOR LINKING SELECTABLE PARAMETERS WITHIN A GRAPHICAL USER INTERFACE

BACKGROUND

Graphical user interfaces (GUIs) are interfaces that allow for a user to interact with electronic devices, such as computer systems, tablets and smart phones. GUIs typically allow for the user interaction by means of graphical icons and visual indicators displayed on a screen, and an input device for interacting with the graphical icons and/or visual indicators. GUI design an important discipline for optimizing the user experience when interacting with a GUI. Some elements of a GUI may be designed to provide feedback to a user through direct messaging. For example, in response to an invalid user input, a GUI not accept the user input and may display a message to the user explaining why the input was invalid. While such feedback mechanisms may be effective in communicating pertinent information to a user, GUI designers are always looking for more effective means of providing explicit or implicit feedback to users for providing simple and clear GUIs.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 5A-D illustrate flow diagrams of examples for linking selectable parameters within a graphical user interface, according to various embodiments.

DESCRIPTION OF EMBODIMENTS

Figure 1:
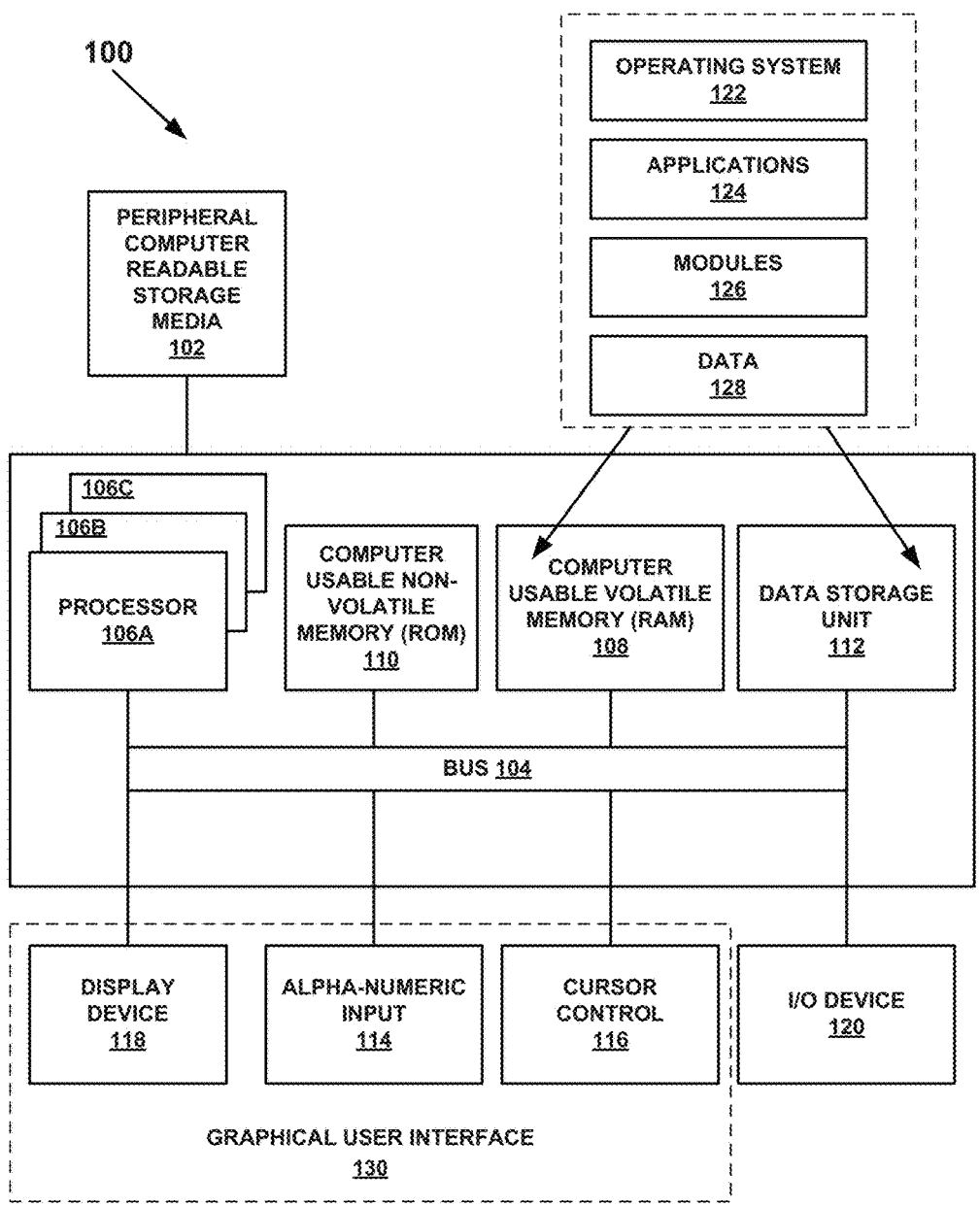
FIG. 1 shows an example computer system upon which embodiments of the present invention can be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying," "receiving," "providing," "determining," "generating," "limiting," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the performance of a graphical user interfaces (GUI), for instance, a GUI used in facilitating the creation of a virtual machine. In a computer-implemented method for linking selectable parameters within a graphical user interface a first selectable parameter and a second selectable parameter are displayed within the graphical user interface, wherein the first selectable parameter is selectable within a first range and the second selectable parameter is selectable within a second range. A selection of the first selectable parameter within the first range is received. Responsive to receiving the selection of the first selectable parameter, an available range of the second range is provided, wherein the available range is a subset of the second range such that a selection of the second selectable parameter is bounded by the available range.

It should be appreciated that GUIs may be designed to provide a particular interactive experience based on the type of information presented and/or received through the GUI. Moreover, a GUI may include one or more different type of interactive elements for receiving information. For example, the interactive elements may include, without limitation: buttons, widgets, controls, text boxes, radio buttons, tri-state boxes, list boxes, numerical input boxes, tool bars, sliders, spinners, drop-down lists, accordion lists, menus, menu bars, tool bars, icons, scroll bars, labels, tooltips, balloon help, status bars, progress bars, etc. The types of interactive elements included in a GUI are typically design decisions, where a GUI designer might attempt to provide particular elements to present and/or receive particular types of information. For example, a simple GUI may include a drop-down list, where a user would select an item from the drop down list.

Moreover, it should be appreciated that an aspect of GUI design is to provide feedback to the user. For example, if the user inputs invalid information, or is limited in the information they may be input, it might be desirable to explain this to the user. This information may be explained explicitly, e.g., via a message, or implicitly, e.g., disallowing the input.

Embodiments described herein provide improved GUI feedback by linking the input for related parameters. It should be appreciated that various selectable parameters for input via a GUI may be linked, such that a selected value for a first parameter may impact a second parameter. For instance, a GUI designer may recognize that a selection of a first selectable parameter may impact a range of available selections for a second selectable parameter. Linking the two selectable parameters provides for feedback by limiting an available range of selection of the second selectable parameter based on the selection of the first selectable parameter.

For example, embodiments described herein provide a GUI for creating a virtual machine. The GUI provides a selectable central processing unit (CPU) capacity parameter and a selectable memory capacity parameter, wherein the parameters are linked. In one embodiment, the selectable CPU capacity parameter and a selectable memory capacity parameter are selectable via a slider. In the creation of a virtual machine, it is recognized that relationship between the CPU capacity and memory capacity may impact the performance of the virtual machine. For instance, it may be understood that a particular CPU capacity performs best when supported by a particular range of memory capacity. For example, if there is not enough memory capacity the virtual machine may not perform as required, and if there is too much memory capacity the virtual machine may not use the full memory capacity, resulting in wasted resources. Accordingly, embodiments described herein provide a GUI in which an available range of memory capacity for selection is impacted based on the CPU capacity selected.

Embodiments described herein provide for linking parameters within a GUI, wherein a selection of a first selectable parameter impacts and available range of selection of a second selectable parameter. Moreover, embodiments herein provide a control for enabling and disabling the linking of the first selectable parameter and the second selectable parameter. Furthermore, embodiments described herein provide sliders for receiving selections of the first selectable parameter and the second selectable parameters. In various embodiments, when linking is enabled, the available range of the slider for the second selectable parameter is impacted by the selection of the first selectable parameter. In one embodiment, the available range of the second selectable parameter is visually represented from the non-available portion(s) of the second selectable parameter, where selection is not permitted within the non-available portion(s). In various embodiments, when linking is disabled, the available range for the second selectable parameter is not impacted by the selection of the first selectable parameter. In one embodiment, the available range of the second selectable parameter had linking been enabled is visually represented within the slider for the second selectable parameter.

Depending on the needs of a particular GUI, it might be desirable to link the input of various selectable parameters. In various embodiments described herein, two selectable parameters are linked such that the available input of one parameter is impacted by the selection of the other parameter. In other embodiments described herein, while the available input for a parameter might not be limited based on the selection of the other parameter, information related to an optimal range of selection of a parameter based on the selection of the other parameter may be presented. Accordingly, the embodiments provided herein improve the performance and user experience of a GUI by linking two selectable parameters such that information related to a recommended selection of a parameter is based on the selection of the other parameter.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C.

System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with system 100 through graphical representations presented on display device 118 by interacting with alphanumeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Example Graphical User Interface Including Linkable Parameters

Example embodiments described herein provide a GUI including linkable parameters. As utilized herein, the term "linkable parameters" refers to parameters for which a selection of a first parameter impacts the selection of a second parameter when linked. It should be appreciated that embodiments described herein provide for selectively enabling and disabling the linking of parameters. In various embodiments, the linking of the parameters may be selectively enabled/disabled via the use of a linking control (e.g., a linking GUI widget).

Figure 2:
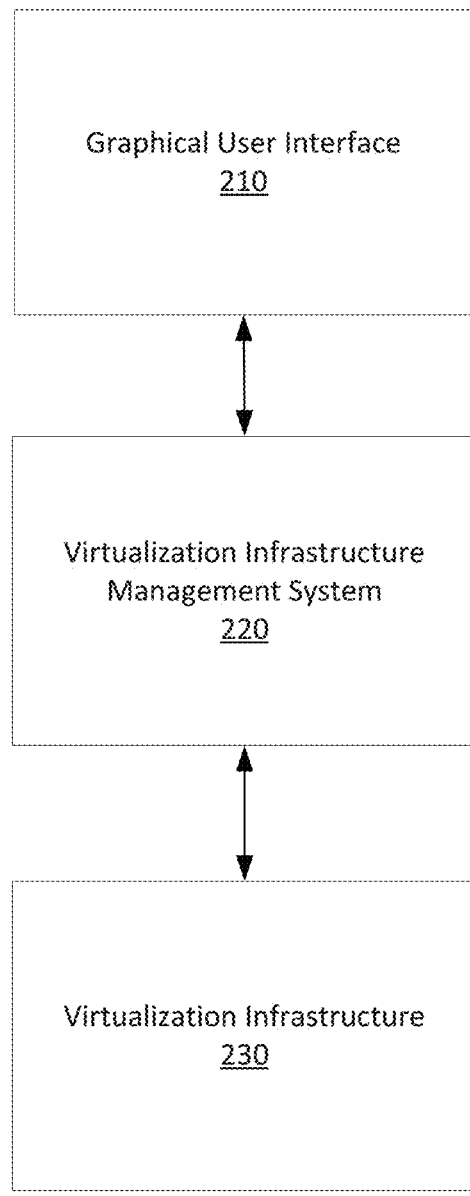
FIG. 2 shows an example virtualization infrastructure management system and graphical user interface, in accordance with various embodiments.

In accordance with various embodiments, a GUI including linkable parameters may be used to assist in the creation of virtual machines of a virtualization infrastructure. For example, with reference now to FIG. 2, virtualization infrastructure management system 220, virtualization infrastructure 230, and graphical user interface 210 are shown, in accordance with various embodiments. It should be appreciated that that virtualization infrastructure 230 can be any type of virtualization infrastructure (e.g., VMware vSphere™ or VMware vCloud Air) and that virtualization infrastructure management system 220 can be any type of system for managing and creating components of a virtualization infrastructure (e.g., VMware vSphere™ VCenter™ or vCloud Air Web Portal).

In one embodiment, virtualization infrastructure management system 220 is configured to provide for the creation and management of components of virtualization infrastructure 230, such as virtual machines. It should be appreciated that the operations of virtualization infrastructure management system 220 may be distributed across multiple instances of virtualization infrastructure 230. For purposes of simplicity, embodiments described herein are directed toward the use GUI 210 in providing management of operations of virtualization infrastructure management system 220 on virtualization infrastructure 230.

In one embodiment, virtualization infrastructure management system 220 is configured to provide the creation of a virtual machine of virtualization infrastructure 230. In facilitating the creation of a virtual machine, a GUI 210 is displayed that provides for user configuration of various parameters of the virtual machine. For example, a GUI 210 may present selectable parameters including CPU capacity and memory capacity for the virtual machine. GUI 210 may also present other selectable parameters, such as storage capacity, as well as projected costs for various selections.

Figure 3A:
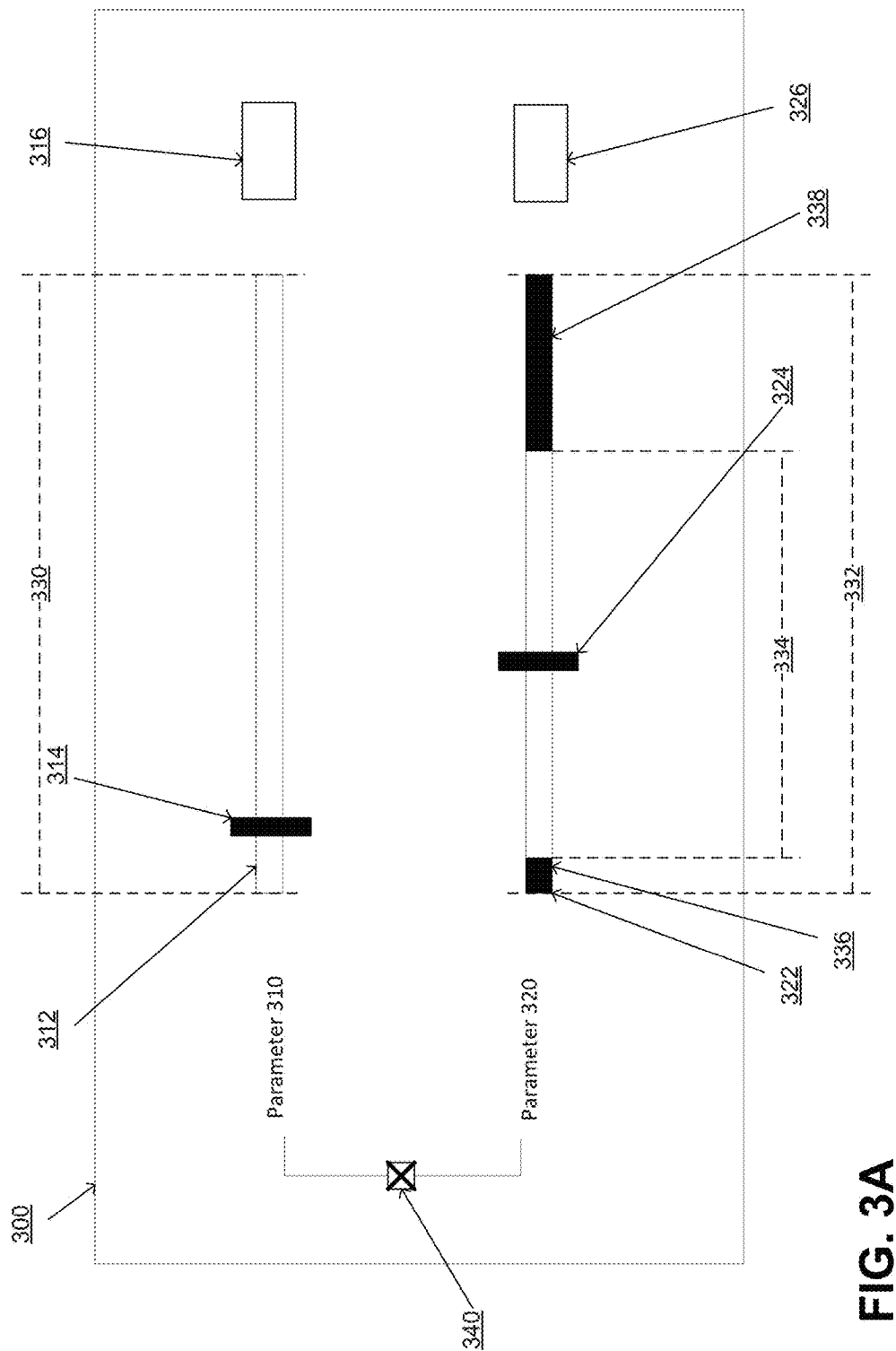
FIGS. 3A-C show views of an example graphical user interface, in accordance with various embodiments.

FIG. 3A shows an example view of a GUI 300, in accordance with various embodiments. It should be appreciated that GUI 300 may be included as a visual component of a larger GUI (e.g., as a widget), and is not limited to the illustrated embodiment. GUI 300 includes first selectable parameter 310 and second selectable parameter 320. It should be appreciated that first selectable parameter 310 and second selectable parameter 320 may be any type of parameter for which a user input may be received. In various embodiments described herein, first selectable parameter 310 and second selectable parameter 320 are configured according to a numerical value, where the numerical value extends across a range of values.

As illustrated, a selection of first selectable parameter 310 is selected by receiving a user interaction slider 312. In one embodiment, a user interaction with an indicator 314 along slider 312 is received (e.g., by dragging the slider selector 314 along slider 312 using a cursor control), wherein the position of the slider selector indicates a user selection. In another embodiment, a user interaction directly with slider 312 is received (e.g., selection of a point on slider 312 using a cursor control), and indicator 314 is indicative of the selection received. In various embodiments, second selectable parameter 320 operates in a similar fashion as first selectable parameter 310, in that second selectable parameter 320 is selected by receiving a user interaction slider 322, where indicator 324 indicates the selection. While embodiments described herein utilize sliders for selection of parameters, it should be appreciated that other GUI elements that are capable of receiving a value from a range of value may also be utilized in various embodiments, including, but not limited to: spinners, dials, scrollbars, etc.

In various embodiments, GUI 300 also includes first alphanumeric text field 316 associated with first selectable parameter 310 and second alphanumeric text field 326 associated with second selectable parameter 320. In one embodiment, the selection indicated by indicator 314 is reflected in first alphanumeric text field 316. In another embodiment, an input received at first alphanumeric text field 316 is reflected by indicator 314. It should be appreciated that in accordance with various embodiments, a selection can be made at either slider 312 or first alphanumeric text field 316, such that the selection at one location is reflected in the other location. Moreover, it should be appreciated that slider 322 and second alphanumeric text field 326 may operate in a similar fashion as slider 312 and first alphanumeric text field 316.

In accordance with various embodiments, first selectable parameter 310 is selectable within a range 330 and second selectable parameter 320 is selectable within a range 332. For example, the ranges may be numerical ranges ranging from a low value to a high value. In one embodiment, the ranges are non-negative ranges of integers extending to a maximum selectable value. In one embodiment, a range begins with zero. In another embodiment, a range begins with a positive integer value. It should be appreciated that the ranges may be linear, exponential, logarithmic, or any other type of range that extends from a low value to a high value. It should be appreciated that the values of the ranges are dependent on the type and nature of the associated parameters, and are typically design decisions.

First selectable parameter 310 and second selectable parameter 320 are linkable, such that a selection of first selectable parameter 310 may impact the selection of second selectable parameter 320. In one embodiment, when linked, the selection of first selectable parameter 310 impacts the available range 334 of selection of second selectable parameter 320, such that the available range 334 is a subset of range 332.

In various embodiments, GUI 300 also includes linking control 340 for enabling and disabling linking between first selectable parameter 310 and second selectable parameter 320. In one embodiment, linking control 340 is selectable for toggling between enabling and disabling the linking between first selectable parameter 310 and second selectable parameter 320. As illustrated in FIG. 3A, linking control 340 is enabled (as indicated by "X" in linking control 340). It should be appreciated that other types of selectable control may be utilized in implementing linking control 340, including, but not limited to, a check box, a button, a radio button, an option button, or another visual control.

In various embodiments, it might be desirable to restrict or control access to linking control 340. For example, a system administrator may link parameters as it is known that for a given selection of a first parameter, only a particular range associated with the second parameter will function. In another example, it is know that for a given selection of a first parameter, a selection of the second parameter that exceeds a given value is excessive and not cost-effective. In such situations, and similar situations, controlling access to linking control 340 might be desirable.

In one embodiment, responsive to receiving a selection disabling the linking control, it is determined whether a user associated with the selection disabling the linking control is authorized to disable the linking control. This may, for example, be determined based on the user's role or permissions, or may require administrator approval. Similarly, it may be desirable not necessarily to control access to linking control 340, but rather to monitor the use of linking control 340. In one embodiment, responsive to receiving a selection disabling the linking control, an alert that the selection disabling the linking control has been received is generated. For example, the alert may be logged and/or may be communicated to an administrator or supervisor.

For example, as illustrated in FIG. 3A, linking control 340 is enabled such that a selection of first selectable parameter 310 impacts the selection of second parameter 320. As shown, an example selection of first selectable parameter 310 is made, as indicated by indicator 314. The example selection impacts available range 334 of second range 332. As shown, portion 336 and portion 338 of range 332 are not available for selection, based on the selection of first selectable parameter 310. It should be appreciated that indicator 324 is not able to be placed within non-available portions 336 and 338. In other words, indicator 324 can only be selected within available range 334. In one embodiment, if a selection of first selectable parameter 310 is made such that indicator 324 would be positioned in a non-available portion, indicator 324 is automatically positioned such that it is located with available range 334 (e.g., at the closest position of available range 334 to the previously available position of indicator 324).

In one embodiment, available range 334 is visually indicated within second range 332. For example, available range 334 and non-available portions 336 and 338 are shown with different colors, shadings, textures, or other visual distinctions. In the illustrated example, available range 334 is shown with a white background and portions 336 and 338 are shown with a black background, however, it should be appreciated that other visual distinctions are available.

Figure 3B:
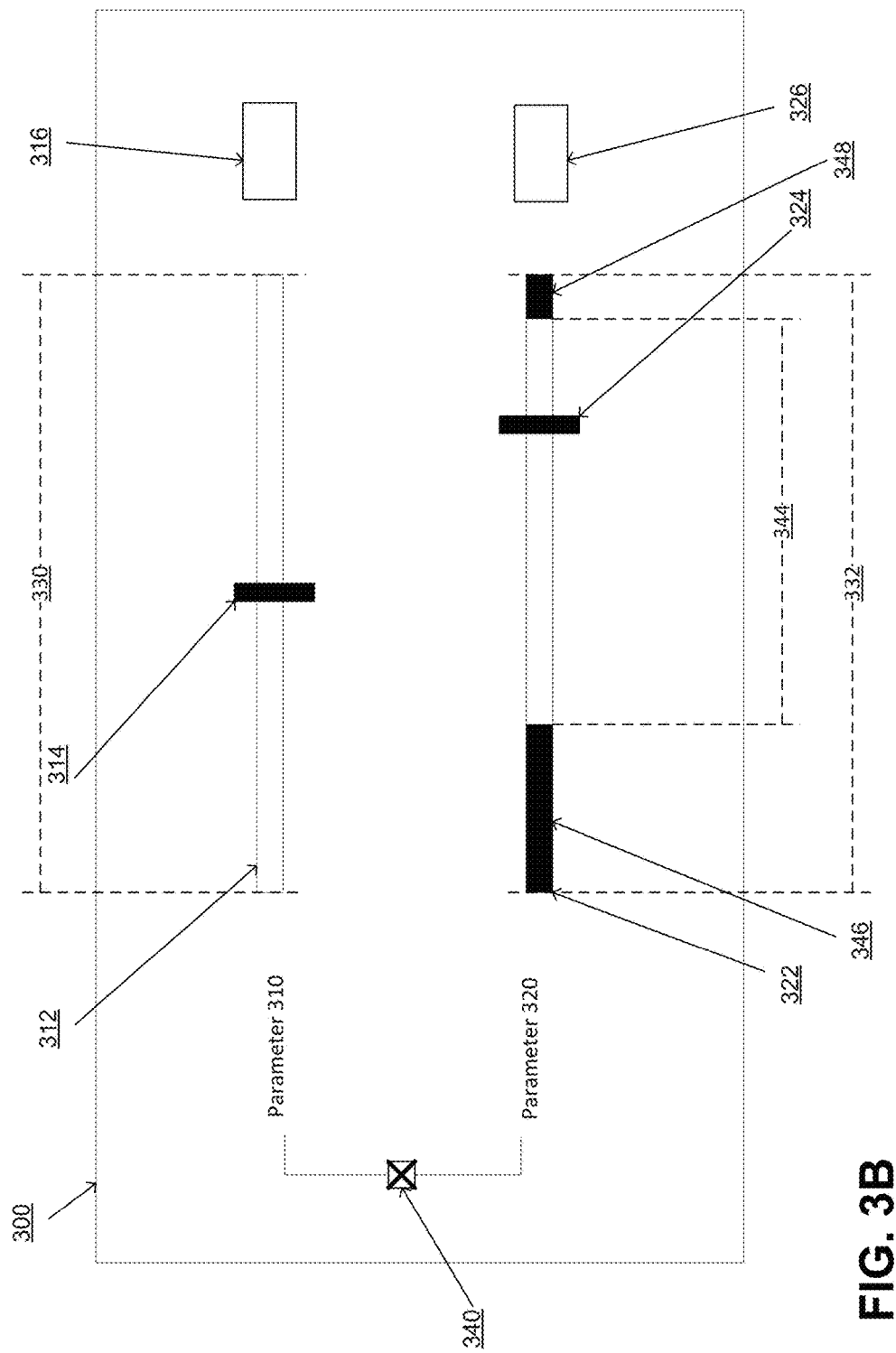

In a further illustration of the same example, as illustrated in FIG. 3B, linking control 340 is enabled and the selection of first selectable parameter 310 is moved, as illustrated by the different position of indicator 314 in FIG. 3B with respect to the position of indicator 314 in FIG. 3A. As illustrated, the change in example selection impacts available range 344 of second range 332 (which is moved relative to available range 334 of FIG. 3A). As shown, portion 346 and portion 348 of range 332 are not available for selection, based on the selection of first selectable parameter 310. It should be appreciated that indicator 324 is not able to be placed within non-available portions 346 and 348.

Figure 3C:
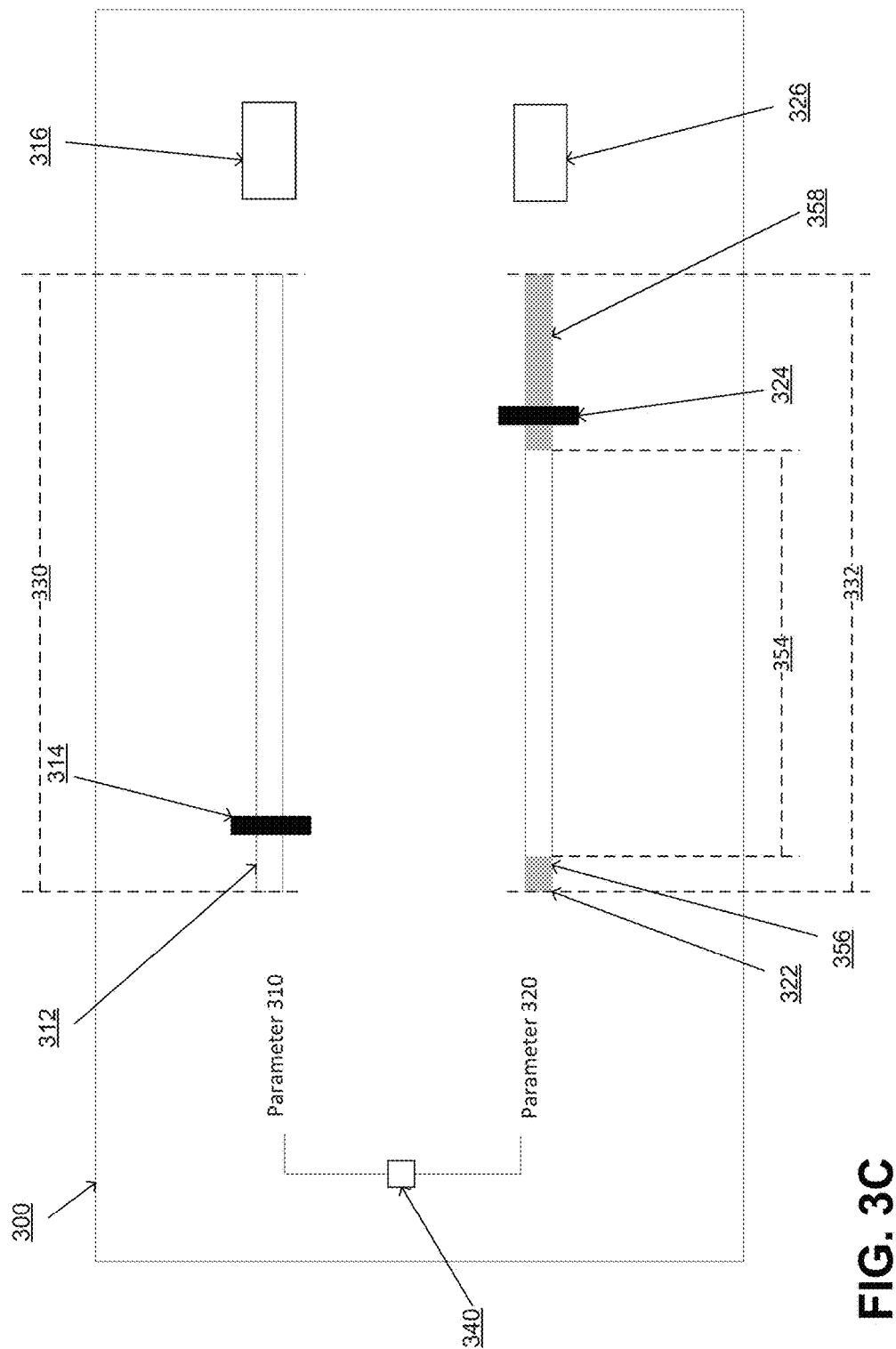

In a further illustration of the same example, as illustrated in FIG. 3C, linking control 340 is disabled. As linking control 340 is disabled, first selectable parameter 310 and second selectable parameter 320 are not linked. Accordingly, in the current embodiment, a selection of first selectable parameter 310 does not impact the available selection of second selectable parameter 320, and the selection of second selectable parameter 320 can be made within the entirety of range 332.

In one embodiment, a preferred range 354 is visually indicated within second range 332, where preferred range 354 indicates the available range when first selectable parameter 310 and second selectable parameter 320 are linked. Second range also includes non-preferred portions 356 and 358, where the non-preferred portions indicate the non-available portions when first selectable parameter 310 and second selectable parameter 320 are linked. In one embodiment, preferred range 354 and non-preferred portions 356 and 358 are illustrated to provide a user making selections of first selectable parameter 310 and second selectable parameter 320 with information to guide a selection without actively limiting the available selections.

For example, preferred range 354 and non-preferred portions 356 and 358 are shown with different colors, shadings, textures, or other visual distinctions. In the illustrated example, preferred range 354 is shown with a white background and non-preferred portions 356 and 358 are shown with a grey background, however, it should be appreciated that other visual distinctions are available. In one embodiment, the visual indictors for non-preferred portions 356 and 358 and non-available portions 336 and 338 are also visually distinct, such that a user enabling and/or disabling linking control 340 would be able to visually distinguish between for non-preferred portions 356 and 358 and non-available portions 336 and 338.

Figure 4A:
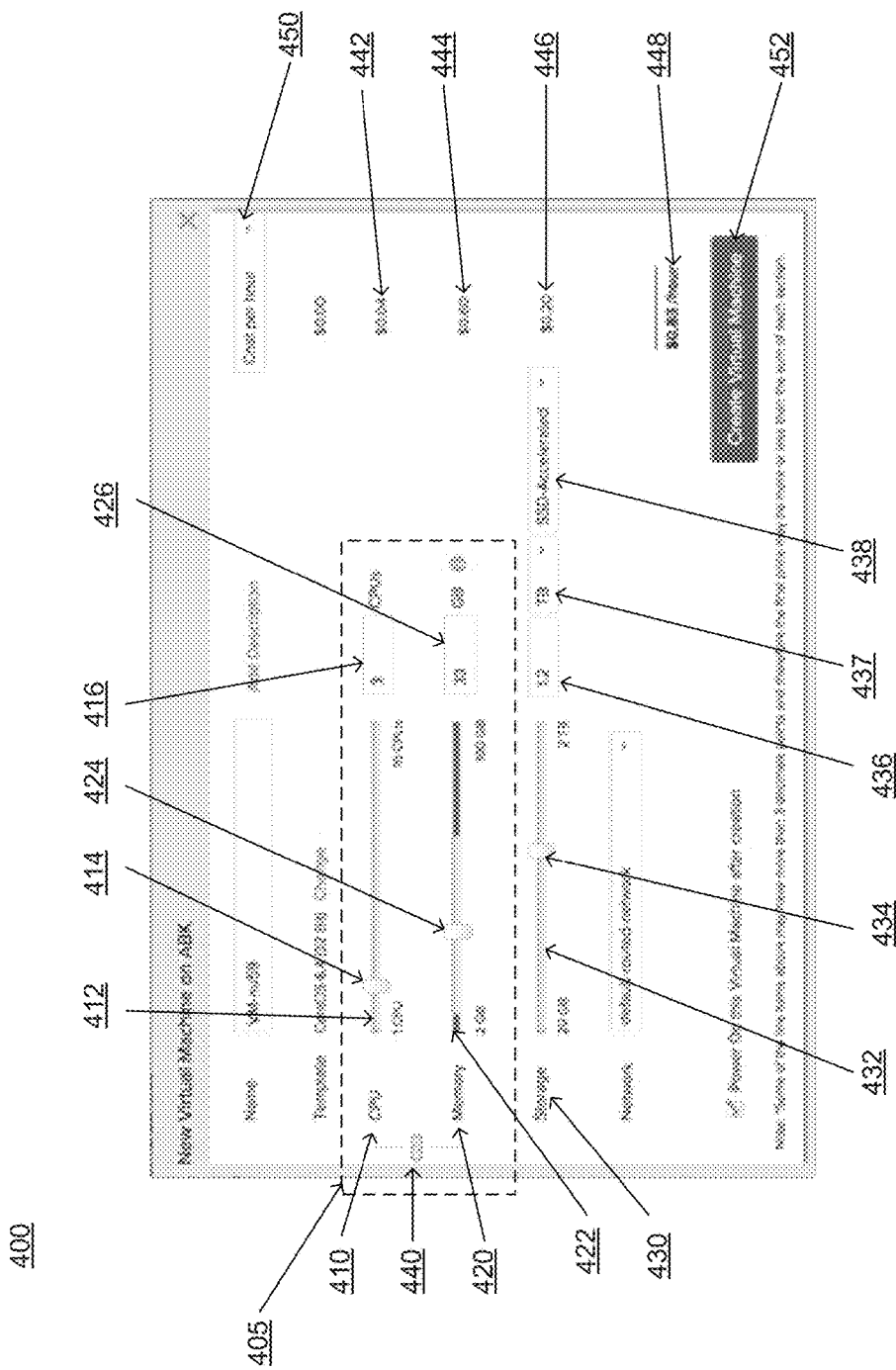
FIGS. 4A-C show views of another example graphical user interface, in accordance with various embodiments.

FIG. 4A shows an example view of a GUI 400, in accordance with various embodiments. GUI 400 provides for the creation and configuration of a new virtual machine by providing selectable parameters, including CPU capacity 410, memory capacity 420, and storage capacity 430.

CPU capacity 410 is selectable responsive to receiving an interaction with slider 412, either directly or via indicator 414. In various embodiments, GUI 400 also includes first alphanumeric text field 416 associated with CPU capacity 410. In one embodiment, the selection indicated by indicator 414 is reflected in first alphanumeric text field 416 (e.g., as shown indicator 414 corresponds to 3 CPUs, as indicated in first alphanumeric text field 416. In another embodiment, an input received at first alphanumeric text field 416 is reflected by indicator 414. For example, as shown, an input of 3 CPUs is received at first alphanumeric text field 416, and indicator 414 is positioned to reflect 3 CPUs on slider 412. It should be appreciated that in accordance with various embodiments, a selection can be made at either slider 412 or first alphanumeric text field 416, such that the selection at one location is reflected in the other location. As illustrated, CPU capacity 410 is selectable within the range of 1 CPU to 16 CPUs. However, it should be appreciated that CPU capacity 410 may be configured to allow for any range of selection, and is not limited to the illustrated embodiment.

Memory capacity 420 is selectable responsive to receiving an interaction with slider 422, either directly or via indicator 424. In various embodiments, GUI 400 also includes second alphanumeric text field 426 associated with memory capacity 420. In one embodiment, the selection indicated by indicator 424 is reflected in second alphanumeric text field 426 (e.g., as shown indicator 424 corresponds to 33 gigabytes (GB), as indicated in second alphanumeric text field 426. In another embodiment, an input received at second alphanumeric text field 426 is reflected by indicator 424. For example, as shown, an input of 33 GB is received at second alphanumeric text field 426, and indicator 424 is positioned to reflect 33 GB on slider 422. It should be appreciated that in accordance with various embodiments, a selection can be made at either slider 422 or second alphanumeric text field 426, such that the selection at one location is reflected in the other location. As illustrated, memory capacity 420 is selectable within the range of 2 GB to 100 GB. However, it should be appreciated that memory capacity 420 may be configured to allow for any range of selection, and is not limited to the illustrated embodiment.

CPU capacity 410 and memory capacity 420 are linkable, as indicated by box 405, such that a selection of CPU capacity 410 may impact the selection of memory capacity 420. In one embodiment, when linked, the selection of CPU capacity 410 impacts the available range of selection of memory capacity 420, such that the available range is a subset of the range of 2 GB to 100 GB.

In various embodiments, GUI 400 also includes linking control 440 for enabling and disabling linking between CPU capacity 410 and memory capacity 420. In one embodiment, linking control 440 is selectable for toggling between enabling and disabling the linking between CPU capacity 410 and memory capacity 420. As illustrated in FIG. 4A, linking control 440 is enabled (as indicated by closed link in linking control 440).

For example, as illustrated in FIG. 4A, linking control 440 is enabled such that a selection of CPU capacity 410 impacts the selection of memory capacity 420. As shown, an example selection of CPU capacity 410 is made, as indicated by indicator 414. The example selection impacts an available range of selection for memory capacity 420. As shown, an available range of selection of memory capacity is bound by darkened portions of slider 422, where the darkened portions are not selectable. For example, as shown, a selection of 3 CPUs prohibits the selection of 2 GB. For a selection of 3 CPUs, the available range of memory capacity 420 is approximately 8 GB to 65 GB. It should be appreciated that the relationship between an available range of memory capacity 420 with respect to a selection of CPU capacity 410 may be a design decision, and may be hard-coded or predefined, such that GUI 400 effectuates the selection limitations.

Figure 4B:
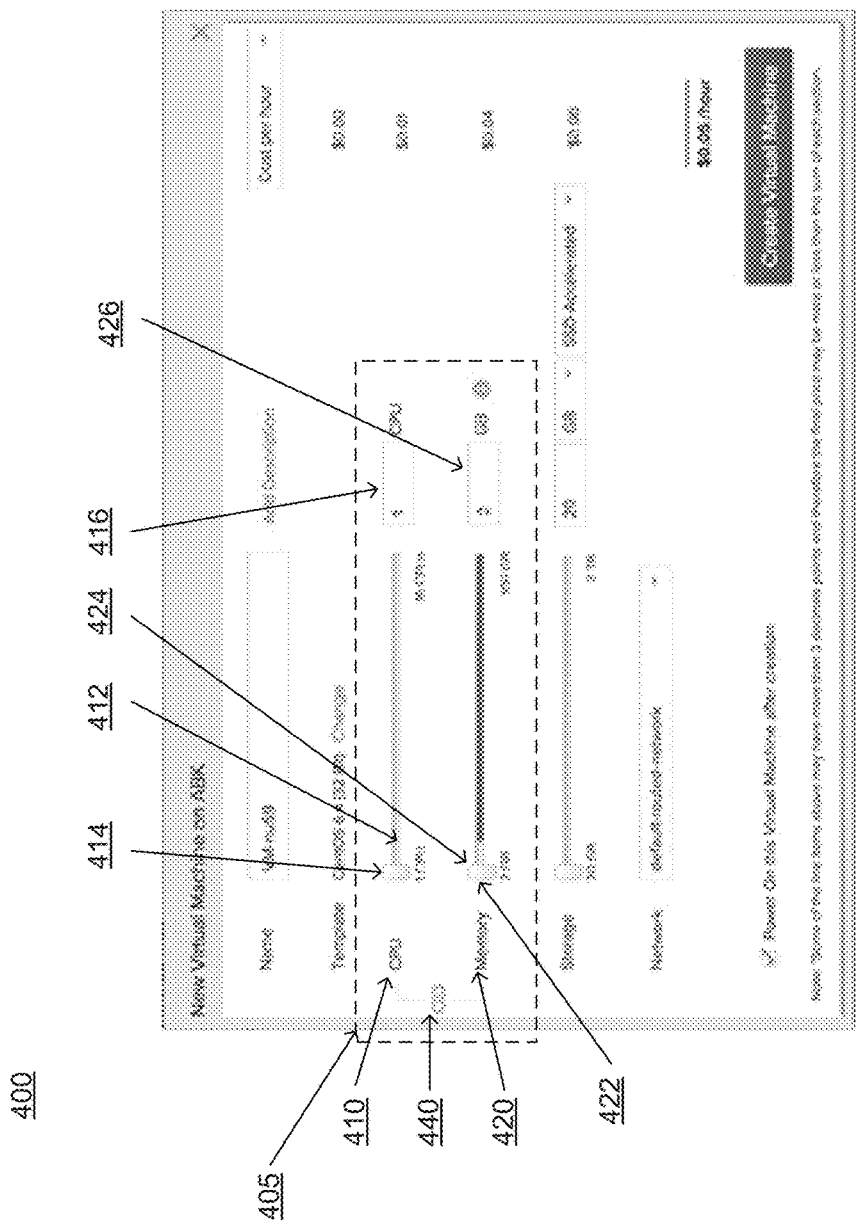

In a further illustration of the same example, as illustrated in FIG. 4B, linking control 440 is enabled and the selection of CPU capacity 410 is moved, as illustrated by the different position of indicator 414 in FIG. 4B with respect to the position of indicator 414 in FIG. 4A. As illustrated, the change in example selection impacts available range of memory capacity 420 (which is moved relative to the available range of FIG. 4A). As shown, for a selection of 1 CPU, the available range of memory capacity 420 is approximately 2 GB to 12 GB. Selection of higher than 12 GB is not available, as indicated by the darkened portion of slider 422.

Figure 4C:
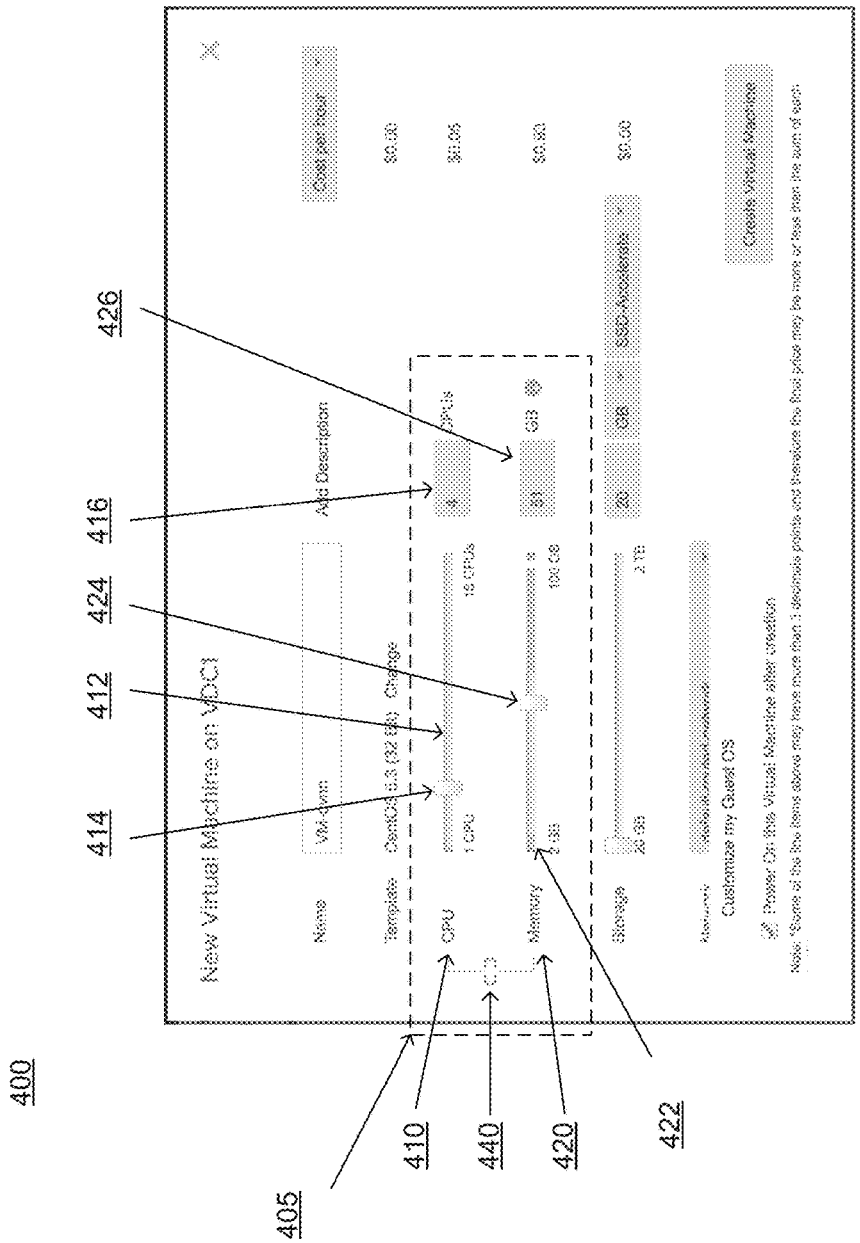

In a further illustration of the same example, as illustrated in FIG. 4C, linking control 440 is disabled. As linking control 440 is disabled, CPU capacity 410 and memory capacity 420 are not linked. Accordingly, in the current embodiment, a selection of CPU capacity 410 does not impact the available selection of memory capacity 420, and the selection of memory capacity 420 can be made within the entirety of range 2 GB to 100 GB.

In one embodiment, a preferred range is visually indicated within slider 422, where the preferred range corresponds to the available range when CPU capacity 410 and memory capacity 420 are linked. Non-preferred selections of memory capacity 420 are also available for selection, and are visually indicated within slider 422. The non-preferred selections correspond to the non-available portions when CPU capacity 410 and memory capacity 420 are linked. In one embodiment, the preferred range and non-preferred selections are illustrated to provide a user making selections of CPU capacity 410 and memory capacity 420 with information to guide a selection without actively limiting the available selections. In one embodiment, the visual indictors for non-preferred selections of FIG. 4C and non-available portions of FIGS. 4A and 4B are also visually distinct, such that a user enabling and/or disabling linking control 440 would be able to visually distinguish between for non-preferred selections and non-available selections.

With reference to FIG. 4A, storage capacity 430 is selectable responsive to receiving an interaction with slider 432, either directly or via indicator 434. In various embodiments, GUI 400 also includes third alphanumeric text field 436 associated with storage capacity 430. In one embodiment, the selection indicated by indicator 434 is reflected in third alphanumeric text field 436 (e.g., as shown indicator 414 corresponds to 20 gigabytes (GB), as indicated in third alphanumeric text field 436. In one embodiment, drop-down menu 437 is selectable for providing different storage sizes for selection (e.g., megabytes (MB), GB, and terabytes (TB)).

In another embodiment, an input received at third alphanumeric text field 436 is reflected by indicator 434. For example, as shown, an input of 20 GB is received at third alphanumeric text field 436, and indicator 434 is positioned to reflect 20 GB on slider 432. It should be appreciated that in accordance with various embodiments, a selection can be made at either slider 432 or third alphanumeric text field 436, such that the selection at one location is reflected in the other location. As illustrated, storage capacity 430 is selectable within the range of 2 GB to 2 TB. However, it should be appreciated that storage capacity 430 may be configured to allow for any range of selection, and is not limited to the illustrated embodiment.

In one embodiment, storage capacity 430 is available in a plurality of selectable types. For example, as shown, drop-down menu 438 is provided for enabling selection between standard storage and solid-state drive (SSD) accelerated storage. In one embodiment, different types of storage are subject to predefined thresholds. In other words, SSD accelerated storage may only be available up to a particular storage capacity selection (e.g., 500 GB), and is unavailable for selection for storage capacities exceeding the threshold. This may be useful, for example, where the cost of different types of storage might be excessive, and it is desired to limit their use to limited circumstances.

In various embodiments, GUI 400 also includes cost indicator 442 corresponding to CPU capacity 410, cost indicator 444 corresponding to memory capacity 420, cost indicator 446 corresponding to storage capacity 430, and total cost indicator 448. Costs indicators 442, 444, 446 and total cost indicator 448 provide the projected cost of the associated selection of a parameter, and dynamically update based on the selection of the corresponding parameter. In one embodiment, drop-down menu 450 is selectable to change the time period of calculating the cost values (e.g., cost per hour, cost per day, or cost per month). It should be appreciated that the calculations associated with projected costs are predefined, and that the projected costs are presented to assist in decision-making behind the selection of parameters for creating a virtual machine. Moreover, it should be appreciated that the calculations for determining the cost may be changed at an administrator level.

In one embodiment, GUI 400 includes button 452 for creating a virtual machine. For example, user selections of CPU capacity 410, memory capacity 420, and storage capacity 430 are received, as well as storage type selected via drop-down menu 438. A selection of button 452 is received, resulting in the creation of a new virtual machine.

Example Methods of Operation

FIGS. 5A-D illustrate a flow diagram 500 of an example method for linking selectable parameters within a graphical user interface, according to various embodiments. Procedures of this method will be described with reference to elements and/or components of FIGS. 3A-C and 4A-C. It is appreciated that in some embodiments, the procedures may be performed in a different order than described, that some of the described procedures may not be performed, and/or that one or more additional procedures to those described may be performed. Flow diagram 500 includes some procedures that, in various embodiments, are carried out by one or more processors under the control of computer-readable and computer-executable instructions that are stored on non-transitory computer-readable storage media. It is further appreciated that one or more procedures described in flow diagram 500 may be implemented in hardware, or a combination of hardware with firmware and/or software.

With reference to FIG. 5A, at procedure 510 of flow diagram 500, in various embodiments, a first selectable parameter (e.g., first selectable parameter 310) and a second selectable parameter (e.g., second selectable parameter) are displayed within a GUI (e.g., GUI 300), wherein the first selectable parameter is selectable within a first range (e.g., range 330) and the second selectable parameter is selectable within a second range (e.g., range 332). In one embodiment, the first selectable parameter comprises a first slider and the second selectable parameter comprises a second slider. In one embodiment, the first selectable parameter further comprises a first alphanumeric text field and the second selectable parameter comprises a second alphanumeric text field, wherein the selection of the first selectable parameter is visually indicated in the first slider and the first alphanumeric text field and the second selectable parameter is visually indicated in the second slider and the second alphanumeric text field. In one embodiment, the first selectable parameter is a CPU capacity of a virtual machine and wherein the second selectable parameter is memory capacity of the virtual machine.

In one embodiment, as shown at procedure 520, a linking control (e.g., linking control 340) is displayed, wherein the linking control is selectable for linking the selection of the first selectable parameter to an available range of the second selectable parameter.

Figure 5B:
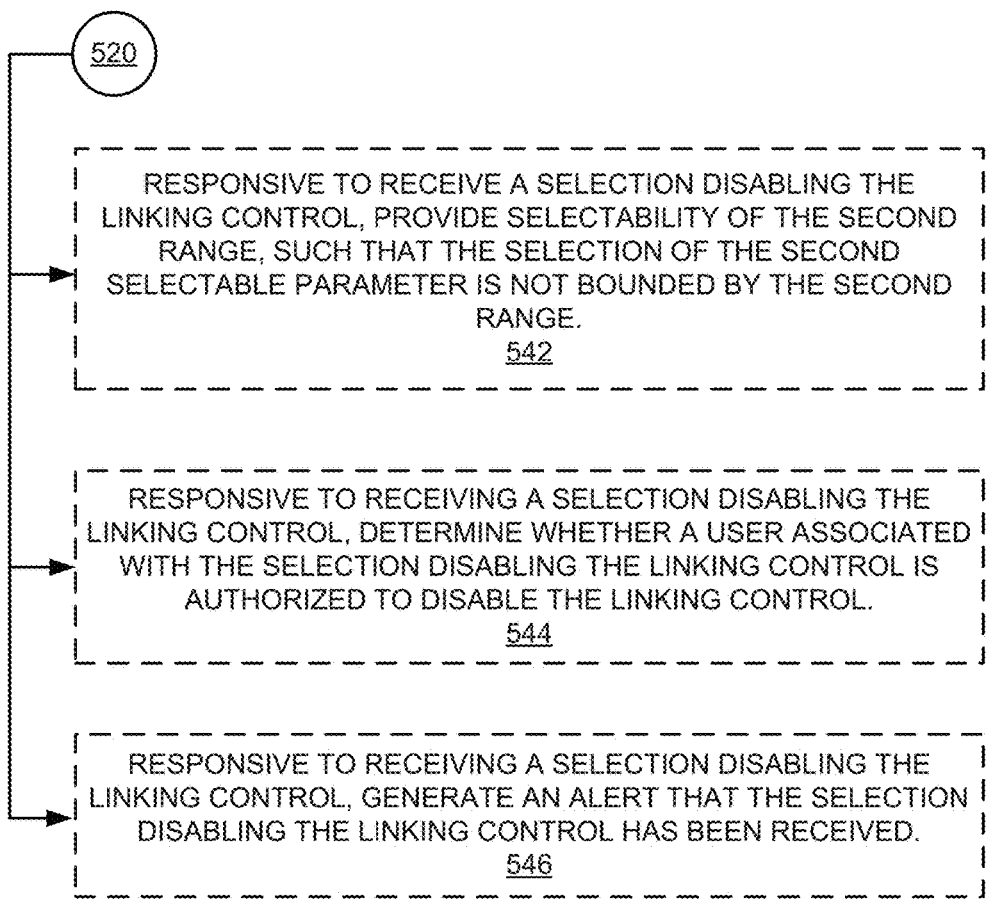

In one embodiment, with reference to FIG. 5B, as shown at procedure 542, responsive to receiving a selection disabling the linking control, selectability of the second range is provided, such that the selection of the second selectable parameter is not bounded by the available range. In one embodiment, the available range and the second range are displayed within the graphical user interface, such that the available range is visually indicated within the second range In one embodiment, as shown at procedure 544, responsive to receiving a selection disabling the linking control, it is determined whether a user associated with the selection disabling the linking control is authorized to disable the linking control. In one embodiment, as shown at procedure 546, responsive to receiving a selection disabling the linking control, an alert that the selection disabling the linking control has been received is generated.

With reference to FIG. 5A, at procedure 530, a selection of the first selectable parameter within the first range is received. At procedure 540, responsive to receiving the selection of the first selectable parameter, an available range of the second range is provided, wherein the available range is a subset of the second range such that a selection of the second selectable parameter is bounded by the available range. In one embodiment, the available range and the second range are displayed within the graphical user interface, such that the available range is visually indicated within the second range.

Figure 5C:
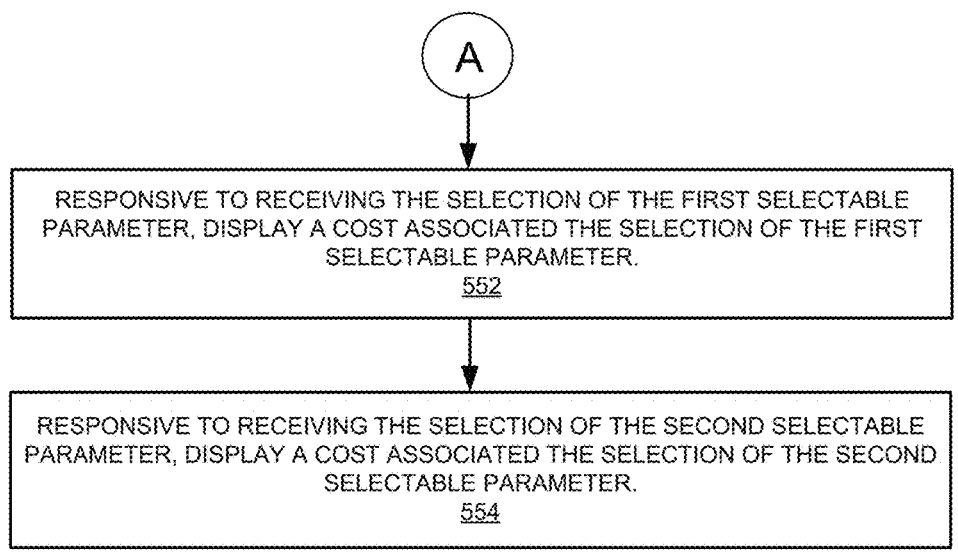

In one embodiment, with reference to FIG. 5C, as shown at procedure 552, responsive to receiving the selection of the first selectable parameter, a cost (e.g., cost indicator 442) associated with the selection of the first selectable parameter. As shown at procedure 554, responsive to receiving the selection of the second selectable parameter, a cost (e.g., cost indicator 444) associated with the selection of the second selectable parameter displayed.

In one embodiment, with reference to FIG. 5D, as shown at procedure 562, a third selectable parameter (e.g., storage capacity 430) is displayed within the graphical user interface, wherein the third selectable parameter is selectable within a third range and wherein the third selectable parameter comprises a plurality of selectable types (e.g., standard storage and SSD accelerated storage indicated at drop-down menu 438). At procedure 564, a selection of the third selectable parameter within the third range is received. At procedure 566, provided the selection of the third selectable parameter exceeds a threshold value within the third range, the plurality of selectable types is limited.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for linking selectable parameters within a graphical user interface, the method comprising:
    displaying a first selectable parameter and a second selectable parameter within the graphical user interface, wherein the first selectable parameter is selectable within a first range and the second selectable parameter is selectable within a second range;
    receiving a selection of the first selectable parameter within the first range; and
    responsive to receiving the selection of the first selectable parameter, providing an available range of the second range, wherein the available range is a subset of the second range such that a selection of the second selectable parameter is bounded by the available range, and wherein the available range and the second range are displayed within the graphical user interface, such that the available range is visually indicated within the second range; and responsive to receiving a selection disabling a linking control that is selectable for linking the selection of the first selectable parameter to the available range of the second selectable parameter, providing selectability of the second range, such that the selection of the second selectable parameter is not bounded by the available range.

2. The computer-implemented method of claim 1, wherein the first selectable parameter comprises a first slider and the second selectable parameter comprises a second slider.

3. The computer-implemented method of claim 2, wherein the first selectable parameter further comprises a first alphanumeric text field and the second selectable parameter comprises a second alphanumeric text field, wherein the selection of the first selectable parameter is visually indicated in the first slider and the first alphanumeric text field and the second selectable parameter is visually indicated in the second slider and the second alphanumeric text field.

4. The computer-implemented method of claim 1, further comprising:
displaying the linking control selectable for linking the selection of the first selectable parameter to the available range of the second selectable parameter.

5. The computer-implemented method of claim 4, further comprising:
responsive to receiving the selection disabling the linking control, determining whether a user associated with the selection disabling the linking control is authorized to disable the linking control.

6. The computer-implemented method of claim 4, further comprising:
responsive to receiving the selection disabling the linking control, generating an alert that the selection disabling the linking control has been received.

7. The computer-implemented method of claim 1, wherein the available range and the second range are displayed within the graphical user interface, such that the available range is visually indicated within the second range.

8. The computer-implemented method of claim 1, further comprising:
responsive to receiving the selection of the first selectable parameter, displaying a cost associated with the selection of the first selectable parameter; and
responsive to receiving the selection of the second selectable parameter, displaying a cost associated with the selection of the second selectable parameter.

9. The computer-implemented method of claim 1, wherein the first selectable parameter is a central processing unit (CPU) capacity of a virtual machine and wherein the second selectable parameter is memory capacity of the virtual machine.

10. The computer-implemented method of claim 1, further comprising:
displaying a third selectable parameter within the graphical user interface, wherein the third selectable parameter is selectable within a third range and wherein the third selectable parameter comprises a plurality of selectable types.

11. The computer-implemented method of claim 10, further comprising:
receiving a selection of the third selectable parameter within the third range; and provided the selection of the third selectable parameter exceeds a threshold value within the third range, limiting the plurality of selectable types.

12. In a computer system having a graphical user interface including a display device and a user interface selection device, a method for linking selectable parameters within a graphical user interface, the method comprising:
providing a graphical user interface comprising:
a first selectable parameter selectable within a first range, wherein the first selectable parameter comprises first slider;
a second selectable parameter selectable within a second range, wherein the second selectable parameter comprises second slider; and
a linking control, wherein the linking control is selectable for linking the selection of the first selectable parameter to an available range of the second selectable parameter;
receiving a selection of the first selectable parameter within the first range;
responsive to receiving the selection of the first selectable parameter, providing an available range of the second range, wherein the available range is a subset of the second range such that a selection of the second selectable parameter is bounded by the available range, and wherein the available range and the second range are displayed within the graphical user interface, such that the available range is visually indicated within the second range; and
responsive to receiving a selection disabling the linking control, providing selectability of the second range, such that the selection of the second selectable parameter is not bounded by the available range.

13. The method of claim 12, wherein the first selectable parameter further comprises a first alphanumeric text field and the second selectable parameter comprises a second alphanumeric text field, wherein the selection of the first selectable parameter is visually indicated in the first slider and the first alphanumeric text field and the second selectable parameter is visually indicated in the second slider and the second alphanumeric text field.

14. The method of claim 12, further comprising:
responsive to receiving a selection disabling the linking control, visually altering the available range within the second range.

15. The method of claim 12, wherein the graphical user interface further comprises:
a first parameter cost indicator for displaying a cost associated with the selection of the first selectable parameter; and
a second parameter cost indicator for displaying a cost associated with the selection of the second selectable parameter.

16. The method of claim 12, wherein the first selectable parameter is a central processing unit (CPU) capacity of a virtual machine and wherein the second selectable parameter is memory capacity of the virtual machine.

17. A computer system comprising:
a graphical user interface;
a display device;
a user interface selection device; and
one or more processors configured to:
provide the graphical user interface for rendering on the display device, the graphical user interface comprising:
a first selectable parameter selectable within a first range, wherein the first selectable parameter is a central processing unit (CPU) capacity of a virtual machine, and wherein the first selectable parameter comprises first slider;

a second selectable parameter selectable within a second range, wherein the first selectable parameter is a memory capacity of a virtual machine, and wherein the second selectable parameter comprises second slider; and a linking control, wherein the linking control is selectable for linking the selection of the first selectable parameter to an available range of the second selectable parameter;

receive a selection of the first selectable parameter within the first range;

responsive to receiving the selection of the first selectable parameter, provide an available range of the second range, wherein the available range is a subset of the second range such that a selection of the second selectable parameter is bounded by the available range, and wherein the available range and the second range are displayed within the graphical user interface, such that the available range is visually indicated within the second range; and responsive to receiving a selection disabling the linking control, provide selectability of the second range, such that the selection of the second selectable parameter is not bounded by the available range, and visually altering the available range within the second range.

18. The computer system of claim 17, wherein the graphical user interface further comprises:

a first parameter cost indicator for displaying a cost associated with the selection of the first selectable parameter; and a second parameter cost indicator for displaying a cost associated with the selection of the second selectable parameter.

* * * * *